United States Patent [19]
Murakami et al.

[11] Patent Number: 5,988,501
[45] Date of Patent: Nov. 23, 1999

[54] IDENTIFICATION METHOD AND APPARATUS UTILIZING PERFORATIONS

[75] Inventors: Takaaki Murakami; Kunihiko Kano, both of Toyonaka, Japan

[73] Assignee: Yuyama Mfg. Co., Ltd., Toyonaka, Japan

[21] Appl. No.: 08/800,293

[22] Filed: Feb. 13, 1997

[30] Foreign Application Priority Data

Feb. 13, 1996 [JP] Japan .................................. 8-025196

[51] Int. Cl.⁶ .................................................. G06K 7/10
[52] U.S. Cl. ........................................... 235/454; 235/494
[58] Field of Search .................................. 235/454, 475, 235/489, 490, 494, 375, 376, 377

[56] References Cited

U.S. PATENT DOCUMENTS

| | | | |
|---|---|---|---|
| 2,258,204 | 10/1941 | Gould | 235/454 |
| 3,644,715 | 2/1972 | Holderith | 235/437 |
| 3,763,355 | 10/1973 | Brand, Jr. | 235/437 |
| 3,852,572 | 12/1974 | Nicoud | 235/485 |
| 3,858,032 | 12/1974 | Scantlin | 235/454 |
| 3,861,301 | 1/1975 | Di Marzio et al. | 101/93.08 |
| 3,896,291 | 7/1975 | Wiedeman | 235/485 |
| 4,276,469 | 6/1981 | Moss | 235/494 |
| 4,329,576 | 5/1982 | Vender Meer et al. | 235/458 |
| 4,423,317 | 12/1983 | Berezowski et al. | 235/458 |
| 4,583,766 | 4/1986 | Wessel | 283/88 |
| 4,695,954 | 9/1987 | Rose et al. | 364/413 |
| 4,780,600 | 10/1988 | Johnston | 235/375 |
| 4,829,168 | 5/1989 | Nakahara | 235/489 |
| 4,853,525 | 8/1989 | Vogt et al. | 235/454 |
| 5,173,595 | 12/1992 | Langsted | 235/458 |
| 5,671,592 | 9/1997 | Yuyama et al. | 53/493 |
| 5,700,998 | 12/1997 | Palti | 235/375 |

Primary Examiner—Donald Hajec
Assistant Examiner—Diane I. Lee
Attorney, Agent, or Firm—Wenderoth, Lind & Ponack, L.L.P.

[57] ABSTRACT

An identification device and method which includes adding an identification pattern to an identification object. The pattern is formed by the absence or presence of identification holes located at a plurality of points on the identification object. In addition, the holes are spaced from one another at a specified pitch. Next, the identification object is transferred along a transfer path parallel to the identification pattern. Then light or an ultrasonic wave is transmitted from one side of the transfer path in a transverse direction of the transfer path. Identification of the identification pattern of the identification object is determined on whether or not the light or the ultrasonic wave is received on the other side of the transfer path.

8 Claims, 9 Drawing Sheets

ID Data : 1 0 0 1 0 1 1 0 1 0

→ Time

Reference sensor : 1 1 1 1 1 1 1 1 1 1

ID Data : 1 0 0 1 0 1 1 0 1 0

IDENTIFICATION METHOD AND APPARATUS UTILIZING PERFORATIONS

BACKGROUND OF THE INVENTION

The present invention relates to an identification method, as well as an apparatus therefor for identifying various types of articles such as ID cards of pharmacists or medicine cartridges in a medicine packaging machine.

Conventionally, as the method for identifying various types of articles such at cards, there has been commonly used a method where identification information like individual numbers, position and other information magnetically preliminarily recorded on an identification object is read with a magnetic head. As a more convenient method, also available is a method as shown in FIG. 12. An identification object 41 is provided with an identification pattern 43 composed of a plurality of points (ten points in the figure), which are given by a combination of the presence or absence of identification holes 42. A number of identification sensors 46 corresponding to the number of points of the identification pattern 43 each comprise a light transmitter 44 and a light receiver 45 located opposite each other. When the identification object 41 is inserted between the light transmitters 44 and the light receivers 45, the identification object 41 is identified depending on whether or not the light receivers 45 receive light transmitted from the individual light transmitters 44.

However, with the conventional method shown in FIG. 12, since the number of identification sensors 46 needs to correspond to the number of points of the identification pattern 43, a large installation space is required and necessarily involves a high cost. Furthermore, incomplete insertion of the identification object 41 would make it difficult for the light receivers 45 to receive light from the light transmitters 44, causing such problems as unidentifiable or misidentified cases.

SUMMARY OF THE INVENTION

The present invention has been accomplished in view of the above problems. An object of the invention is to provide an identification method, as well as an apparatus therefor, which is capable of identifying an identification object reliably and inexpensively with a small number of identification sensors.

In order to achieve the aforementioned object, the identification method according to a first aspect of the invention comprises several steps.

The first step includes adding an identification pattern to an identification object by making or omitting an identification hole, at a plurality points an the identification object, spaced from one another at a specified pitch.

The second step includes transferring the identification object along a transfer path parallel to the identification pattern.

The third step includes transmitting light or an ultrasonic wave from one side of the transfer path in a transverse direction of the transfer path.

The fourth step includes identifying the identification pattern of the identification object depending on whether or not the light or the ultrasonic wave is received on the other side of the transfer path.

In this identification method, since the identification pattern is identified during the transfer of the identification object, the identification pattern can be identified with reliability irrespective of whether or not the identification object has completely been fed in or loaded. Besides, since one identification sensor will do for the identification, the cost is low.

The identification method according to a second aspect of the invention also comprises several steps.

The first step includes providing an identification object with a reference pattern composed of a plurality of reference holes adjacent to an identification pattern formed by making or omitting an identification hole, at a plurality of points corresponding to the reference holes of the reference pattern, The second step includes transferring the identification object along a transfer path parallel to the reference pattern or the identification pattern.

The third step includes transmitting light or an ultrasonic wave from one side of the transfer path in a transverse direction of the transfer path.

The fourth step includes identifying the identification pattern of the identification object depending on whether or not the light or the ultrasonic wave is received through the identification pattern when the light or the ultrasonic wave is received through the reference pattern on the other side of the transfer path.

In this identification method, since the identification pattern is identified after the reference pattern is identified, the identification object can be identified even if the transfer speed of the identification object is irregular.

The identification apparatus according to a third aspect of the invention is an apparatus for carrying out the method of the first aspect of the invention.

The apparatus includes an identification object to which an identification pattern is added by making or omitting an identification hole, at a plurality of points, spaced from one another at a specified pitch. The identification object is intended to be transferred along a transfer path parallel to the identification pattern.

The apparatus also includes an identification sensor for transmitting light or an ultrasonic wave from one side of the transfer path in a transverse direction of the transfer path. The sensor identifies the identification pattern of the identification object depending on whether or not the light or the ultrasonic wave is received on the other side of the transfer path.

As a preferred embodiment of this third aspect of the invention, the identification apparatus may further comprise transfer means for transferring the identification object at a constant speed along the identification pattern. In this case, the irregularity in the transfer speed of the identification object is eliminated so that the identification becomes easier to accomplish.

The identification apparatus according to a fourth aspect of the invention is an apparatus for carrying out the second aspect of the invention.

The apparatus includes an identification object which is provided with a reference pattern composed of a plurality of reference holes, adjacent to an identification pattern formed by making or omitting an identification hole at a plurality of points corresponding to the reference holes of the reference pattern. The identification object is intended to be transferred along a transfer path parallel to the reference pattern or the identification pattern.

In addition, the apparatus includes a reference sensor for transmitting light or an ultrasonic wave from one side of the transfer path in a transverse direction of the transfer path. The sensor is also used for receiving the light or the ultrasonic wave through the reference holes on the other side of the transfer path.

Also, the apparatus includes an identification sensor for transmitting light or an ultrasonic wave from one side of the transfer path in a transverse direction of the transfer path and for identifying the identification pattern of the identification object depending on whether or not the light or the ultrasonic wave is received through the identification pattern when the reference sensor has identified the reference pattern.

In a preferred embodiment of the fourth aspect of the invention, the identification pattern of the identification object may be placed so as to be shifted along the transfer path of the identification object with respect to the reference pattern.

In addition, the identification sensor may identify the identification pattern of the identification object depending on whether or not the light or the ultrasonic wave is received through the identification pattern after a certain time (x) elapses since the reference sensor identifies the reference pattern. In this case, instead of shifting the reference pattern and the identification pattern, the identification sensor may be provided so as to be shifted along the transfer direction of the identification object with respect to the reference sensor. Also, the certain time (x) is preferably set to time corresponding to one half or less of the pitch of the reference pattern.

In this case, when the identification object is transferred in a certain direction, the identification pattern is identified after a lapse of time (x) since the reference pattern is identified. On the other hand, when the identification object is transferred in the opposite direction, the identification pattern is identified after a lapse of time (x+a). Accordingly, the identification pattern is identified only when the identification object is transferred in a certain direction, and is not identified when it is transferred in the opposite direction. As a result of this, not only the identification of the identification pattern of the identification object but also the feed-in and pull-back, as well as loading (mounting) and unloading (removal) of the identification object are identified. Therefore, it becomes possible that when the identification object is fed in or loaded, the identification pattern is identified and its data is registered, and that when the identification object is pulled back or unloaded, the registered data is erased.

As another preferred embodiment, the identification object may be a medicine cartridge which can be removably mounted to a motor base. In this case, the medicine cartridge loaded to the motor base can be identified with reliability. Also, in this case where the location where the medicine cartridge is loaded to the motor base is previously determined, when the medicine cartridge is loaded to a different motor base, it can be easily detected that the medicine cartridge has been mis-loaded, by identifying the medicine cartridge.

In still another preferred embodiment, the medicine cartridge may have a load-completion detecting hole through which the light or the ultrasonic wave of the reference sensor or the identification sensor passes when the medicine cartridge is completely loaded to the motor base. Thus, since a complete loading of the medicine cartridge can be correctly detected, a reliable operation of the motor base can be ensured.

DETAILED DESCRIPTION OF THE PREFERRED EMBODIMENT

Figure 1:
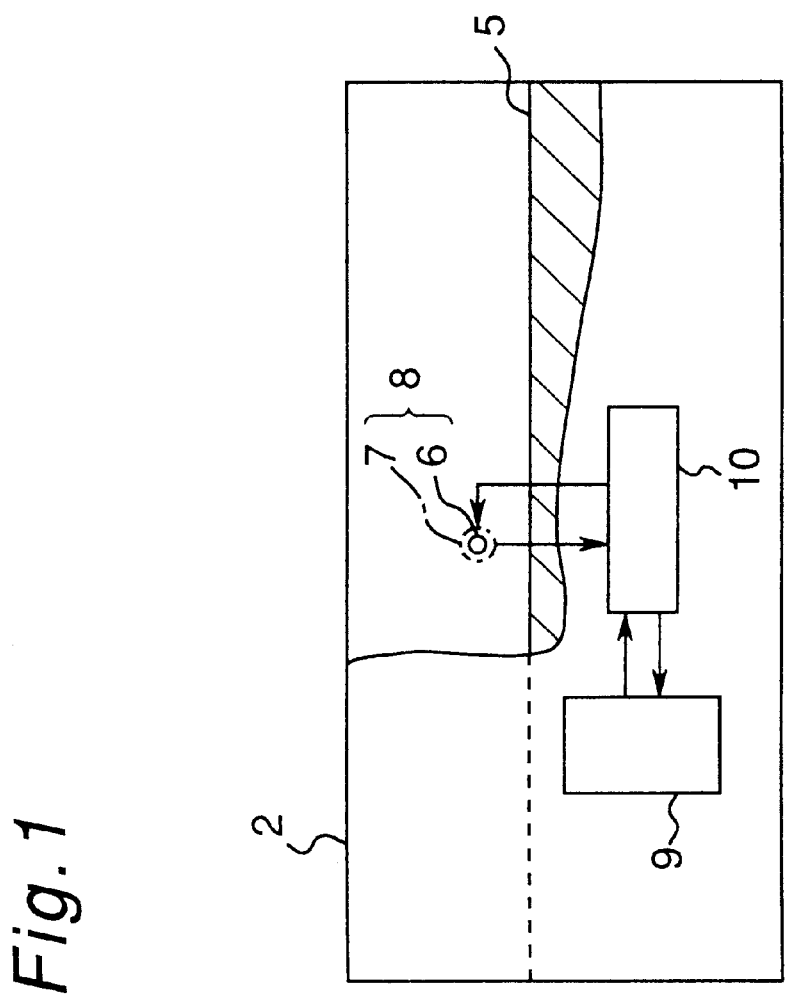
FIG. 1 is a partly broken front view showing a card reader according to a first embodiment of the present invention.
Figure 1:
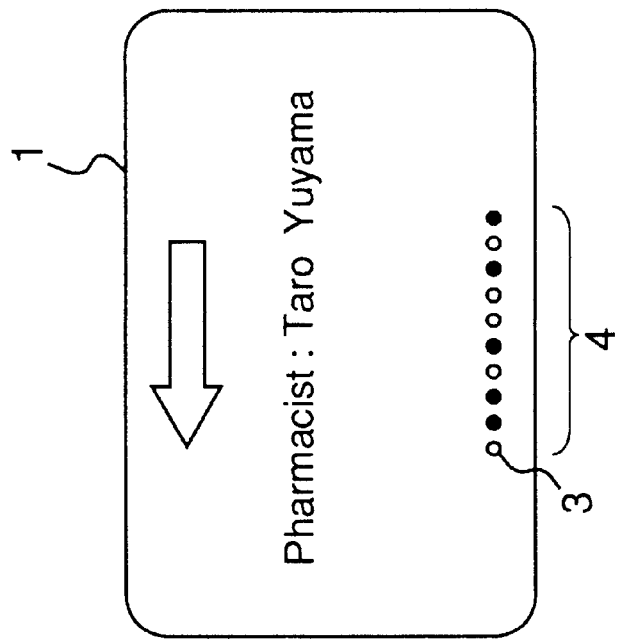

FIG. 1 shows an identification apparatus according to a first embodiment of the present invention. This identification apparatus comprises an ID card 1 as an identification object which is possessed by a pharmacist at hospitals, pharmacies or the like, and a card reader 2 for identifying the ID card 1.

The ID card 1 is given a 10-digit identification pattern 4 corresponding to the identification number of the pharmacist. The identification pattern 4 is formed by providing or omitting an identification hole 3 at each of ten points which are spaced from one another at a specified pitch along the direction in which the card reader 2 is inserted (shown by an arrow in FIG. 1). In FIG. 1, a white circle denotes a point where an identification hole 13 is bored, while a black circle denotes a point where an identification hole 3 is not bored.

Figure 2A:
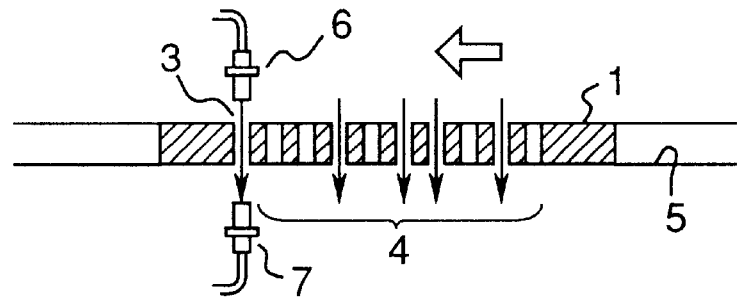
FIGS. 2A and 2B are sectional views showing how an identification pattern of an ID card is identified by an identification sensor of the card reader of FIG. 1.

The card reader 2 has a groove 5 serving as a transfer path along which the ID card 1 is inserted. In a generally intermediate point between an inlet end and an outlet end of this groove 5, there is provided an identification sensor 8 comprising a light transmitter 6 and a light receiver 7. The light transmitter 6, which is implemented by a light emitting device, is placed on one side of the groove 5, as shown in FIG. 2A. The light receiver 7, which is implemented by a light receiving device, is placed on the other side of the groove 5 so as to be opposed to the light transmitter 6. As a result of this arrangement, light emitted from the light transmitter 6 is received by the light receiver 7 across the groove 5. In addition, the light transmitter 6 and the light receiver 7 are arranged so that the height from the bottom of the groove 5 coincides with the height from the lower end of the ID card 1 to the identification hole 3.

The card reader 2 has a memory section 9 for preliminarily storing identification numbers of many registered pharmacists, and a control section 10 for outputting a light transmission signal to the light transmitter 6 of the identification sensor 8 as well as for identifying the ID card 1 based on a light reception signal from the light receiver 7.

Next, the operation of the identification apparatus having the above constitution will be explained.

Figure 3:
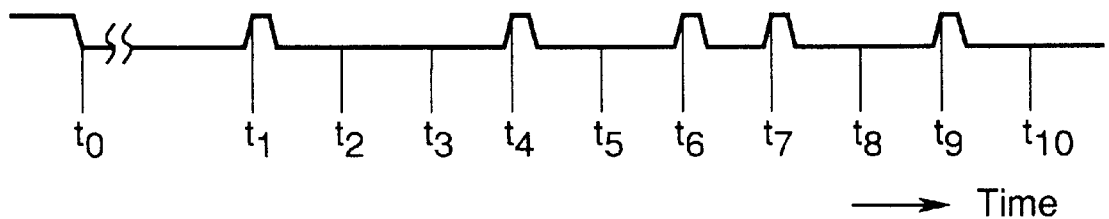
FIG. 3 is a waveform diagram showing an identification signal by an identification sensor of the card reader of FIG. 1.

The control section 10 of the card reader 2 first outputs a light transmission signal to the light transmitter 6, causing the light transmitter 6 to transmit specific light. Then, the control section 10 waits until the ID card 1 is inserted. At this time, the light receiver 7 receives the light transmitted from the light transmitter 6. However, since this received signal is a continuous ON signal as shown in the range before time $t_0$ in FIG. 3, the control section 10 determines that the received signal is not an identification signal. When the ID card 1 is inserted into the groove 5 of the card reader 2 and is transferred at a constant speed, the end of the ID card 1 cuts off the light transmitted from the light transmitter 6. When this occurs, the received signal of the light receiver 7 goes OFF at time $t_0$ as shown in FIG. 3. However, since this signal is a continuous OFF signal, the control section 10 determines that the signal is not an identification signal.

Figure 2B:
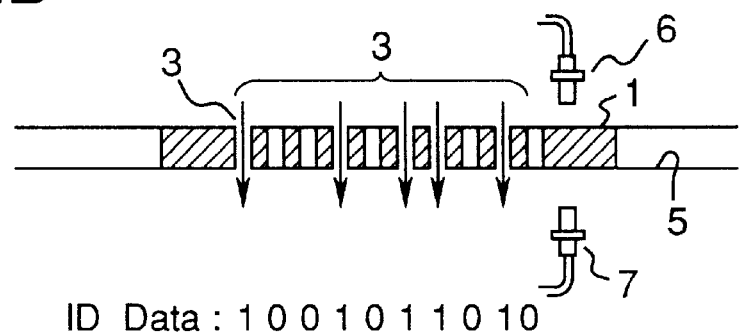

When the ID card 1 is further transferred so that the first-digit point of the identification pattern 4 reaches the position of the identification sensor 8, the presence of the identification hole 3 in the first digit would allow light transmitted from the light transmitter 6 to pass through the identification hole 3 while the absence of the identification hole 3 would cut off the light. After a certain time has elapsed from the passage of the first-digit point through the identification sensor 8, the second-digit point passes through the identification sensor 8. After the points up to the tenth digit pass through the identification sensor 8 individually in a similar manner, an ON/OFF signal corresponding to the identification pattern 4 is obtained in steps as each digit point passes through the identification sensor 8, as shown at $t_1$, $t_2$, ..., $t_{10}$ in FIG. 3. The control section 10 reads this ON/OFF signal as identification data composed of 1s and 0s as shown in FIG. 2B, compares the identification data with registered data stored in the memory section 9, and judges the truth or falsity of the inserted ID card 1 depending on whether or not data coincident with the identification data is present.

In this first embodiment, when the insertion speed of the ID card 1 is irregular, since the speed depends on the users, the identification signal of the identification pattern 4 cannot be obtained at a constant time pitch so that identification is difficult. In such a case, it is preferable to provide a transfer mechanism, such as a roller, which transfers the ID card 1 through the card reader 2 at a constant speed.

Figure 4:
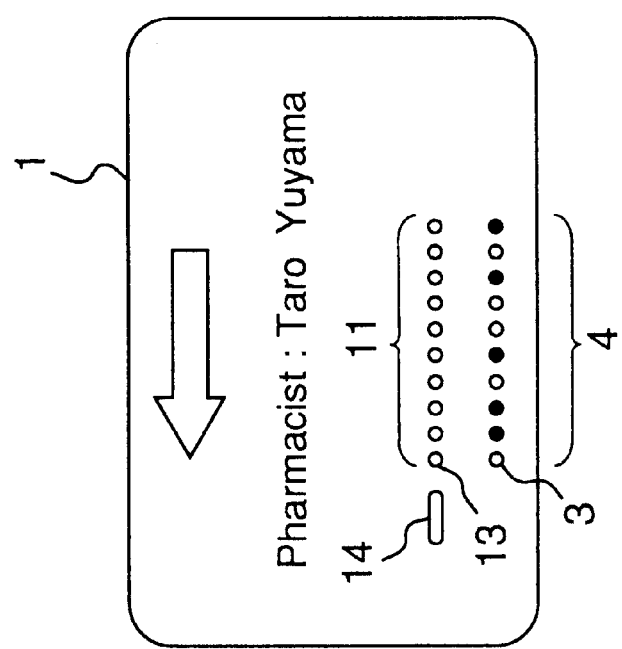
FIG. 4 is a partly broken front view showing a card reader according to a second embodiment of the invention.
Figure 4:
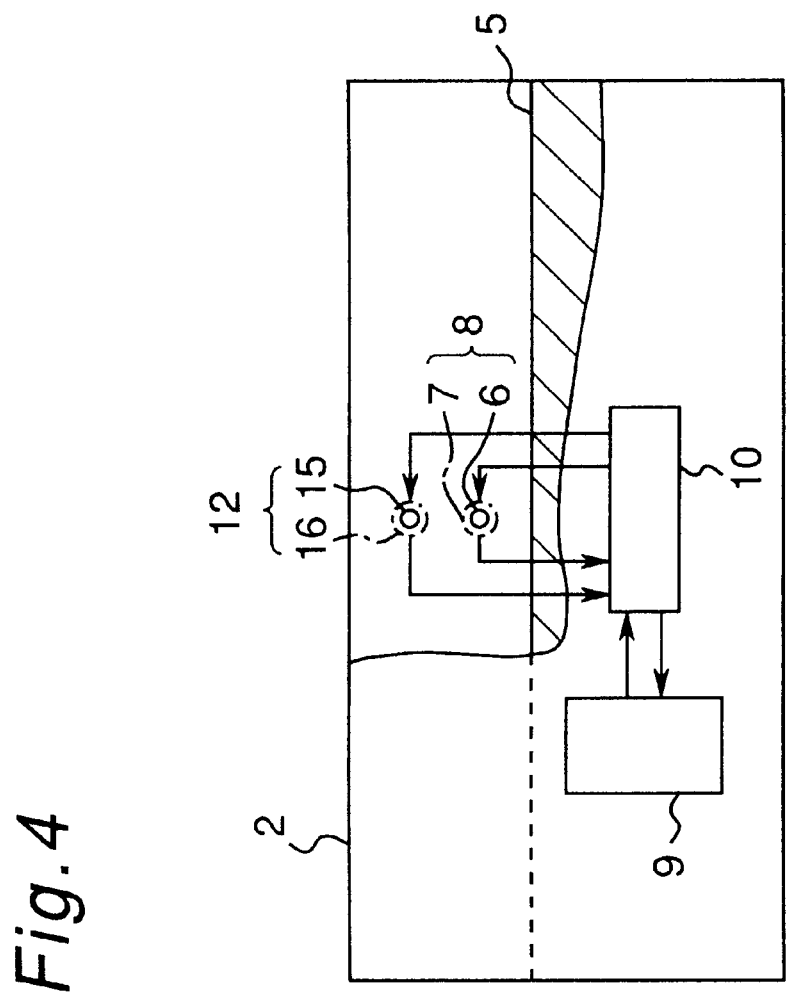

FIG. 4 shows an identification apparatus according to a second embodiment of the present invention. In this identification apparatus, a reference pattern 11 is provided in the ID card 1 beside or adjacent to the identification pattern 4, and a reference sensor 12 is provided in addition to the identification sensor 8 of the card reader 2. Otherwise, this identification apparatus is substantially the same as that of the first embodiment, and corresponding components are denoted by like numerals and omitted in explanation.

The reference pattern 11 of the ID card 1 is placed above the ten-digit identification pattern 4, where reference holes 13 are formed in correspondence to all the 10-points of the identification pattern 4, respectively. Furthermore, in front of this reference pattern 11, a slit 14 is formed measuring longer than the diameter of each reference hole 13 of the reference pattern 11.

Figure 5A:
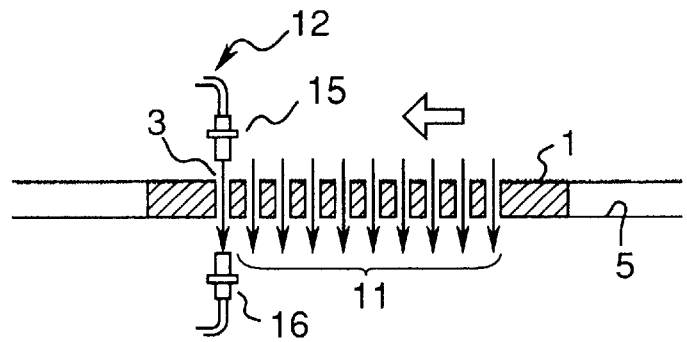
FIGS. 5A, 5B, 5C and 5D are sectional views showing how an identification pattern of an ID card is identified by an identification sensor of the card reader of FIG. 4.

The reference sensor 12 of the card reader 2 is designed to identify the reference pattern 11 of the ID card 1. As shown in FIG. 5A, the reference sensor 12 comprises a light transmitter 15 and a light receiver 16 arranged opposite each other on both sides of the groove 5, like the identification sensor B. This reference sensor 12,is placed above the identification sensor 8. The height of the reference sensor 12 from the bottom of the groove 5 of the card reader 2 is equal to the height from the lower end of the ID card 1 to the reference holes 13.

Next, the operation of the identification apparatus having the above constitution will be explained.

Figure 6:
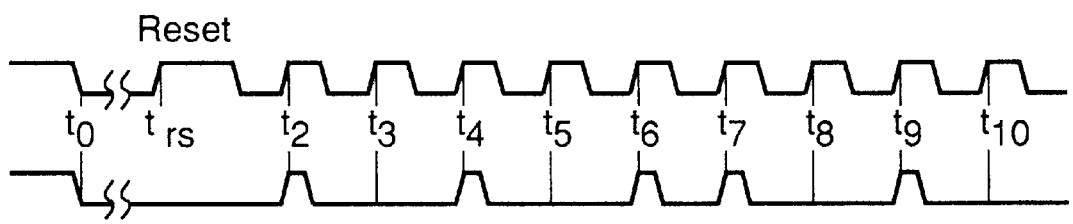
FIG. 6 is a waveform diagram showing an identification signal by an identification sensor of the card reader of FIG. 4.

The control section 10 of the card reader 2 first outputs a light transmission signal to the light transmitter 6 of the identification sensor 8 and the light transmitter 15 of the reference sensor 12, causing the light transmitters 6, 15 to transmit specific light. Then, the control section 10 waits until the ID card 1 is inserted. At this time point, the light receivers 7, 16 receive the light transmitted from the light transmitters 6, 15. However, since both of these received signals are continuous ON signals as shown in the range before time $t_0$ in FIG. 6, the control section 10 determines that the received signals are not identification signals. When the ID card 1 is inserted into the groove 5 of the card reader 2 and transferred, the end of the ID card 1 cuts off the light transmitted from the light transmitters 6, 15. When this occurs, the received signals of the light receivers 7, 16 go OFF at time $t_0$ as shown in FIG. 6. However, since these signals are continuous OFF signals, the control section 10 determines that these signals are not identification signals.

When the ID card 1 is further transferred so that the slit 14 of the reference pattern 11 reaches the position of the reference sensor 12, light transmitted from the light transmitter 15 of the reference sensor 12 passes through the slit 14. As a result, the light receiver 16 receives the light derived from the light transmitter 15 as a reset signal as shown in FIG. 6. Then, based on this reset signal, the control section 10 resets the previous identification data and waits for the next identification pattern 4 to be identified.

Figure 5B:
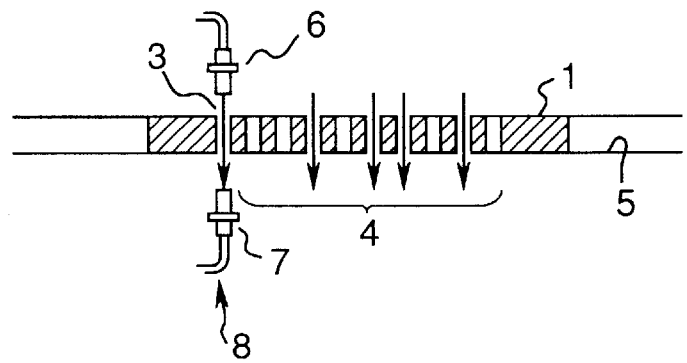
Figure 5C:
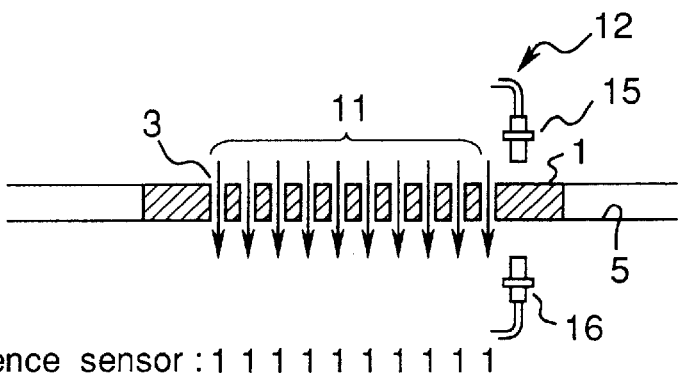
Figure 5D:
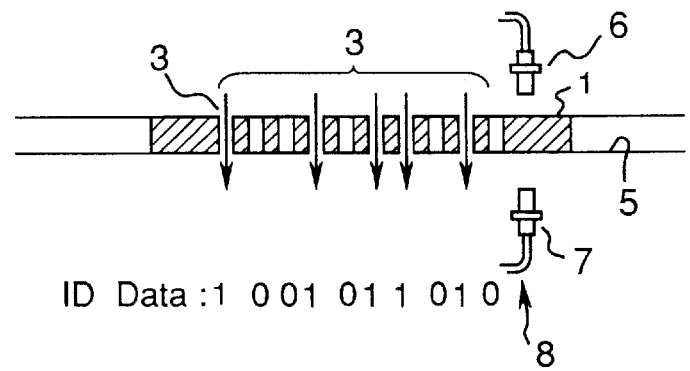

Every time a reference hole 13 of the reference pattern 11 of the ID card 1 reaches the position of the reference sensor 12, light transmitted from the light transmitter 15 passes through the pertinent reference hole 13. As a result, as shown by $t_1, t_2, \ldots, t_{10}$ in FIG. 6, the light receiver 16 receives the light derived from the light transmitter 15, so that ON/OFF signals are obtained at regular time intervals. Meanwhile, when the first digit point of the identification pattern 4 reaches the position of the identification sensor 8, the presence of an identification hole 3 in the first digit of the identification pattern 4 allows the light transmitted from the light transmitter 6 to pass through the identification hole 3 while the absence of an identification hole 3 cuts off the light. After a certain time has elapsed from the passage of the first-digit point through the identification sensor 8, the second-digit point passes through the identification sensor 8. After the points up to the tenth digit pass through the identification sensor 8 individually in a similar manner, an ON/OFF signal corresponding to the identification pattern 4 is obtained as shown at $t_1, t_2, \ldots, t_{10}$ in FIG. 6. The control section 10 reads the resultant ON/OFF signal as identification data composed of 1s and 0s as shown in FIG. 5B, depending on whether the light receiver 7 of the identification sensor 8 receives an ON signal or an OFF signal when the light receiver 16 of the reference sensor 12 has received an ON signal. The central section then compares the identification data with registered data stored in the memory section 9, and judges the truth or falsity of the inserted ID card 1 depending on whether or not data coincident with the identification data is present.

In this way, every time the reference sensor 12 identifies the reference pattern 11, the identification sensor 8 identifies the identification pattern 4 of the ID card 1, so that the identification pattern 4 of the ID card 1 can be identified with reliability even if the speed at which the ID card 1 is inserted is irregular.

Figure 7:
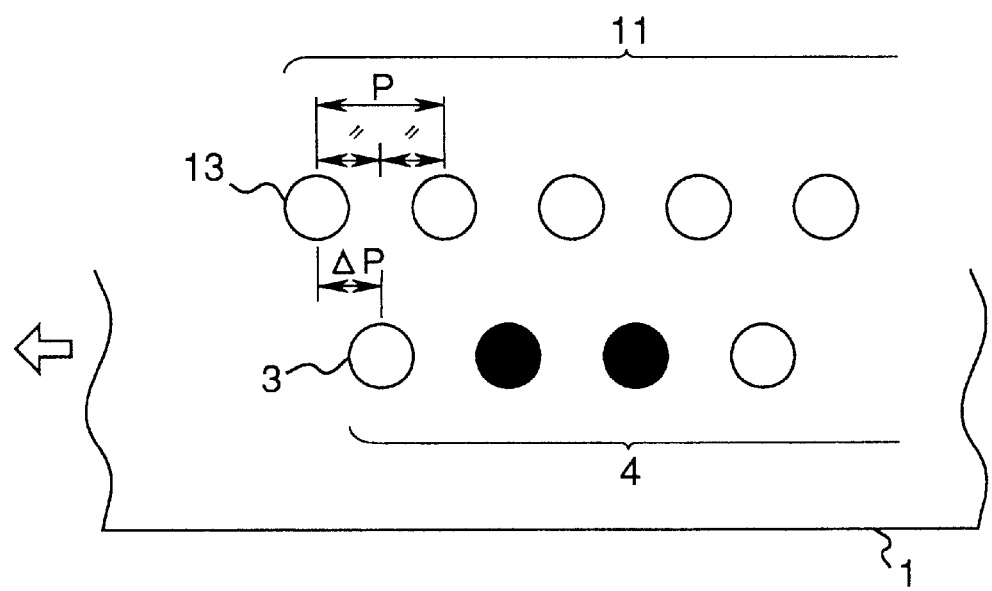
FIG. 7 is a partly enlarged front view showing an arrangement of an identification pattern and a reference pattern of an ID card according to a third embodiment of the invention.
Figure 8:
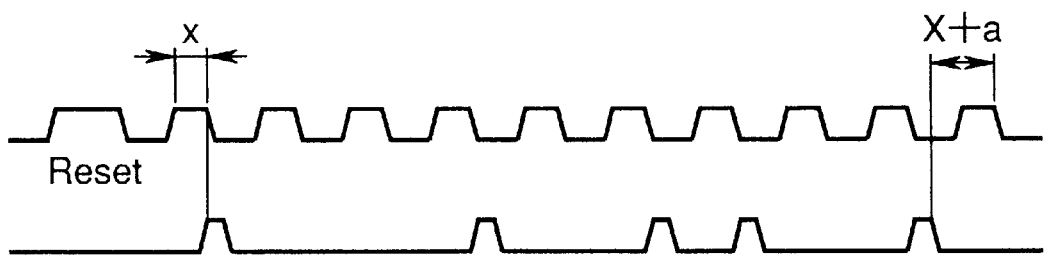
FIG. 8 is a waveform view showing an identification signal of the ID card of FIG. 7.

FIG. 7 shows a third embodiment of the present invention. In this embodiment, the identification is pattern 4 of the ID card 1 is so placed that the identification pattern 4 is shifted backward in the transfer (insertion) direction by a distance Δp, which is less than a half of the pitch p of the reference pattern 11. In this case, when the ID card 1 is inserted in the direction of an arrow as shown in FIG. 7, the light receiver 16 of the reference sensor 12 detects the ON signal on the basis of the reference pattern 4 as shown in FIG. 8, and then the light receiver 7 of the identification sensor 8 receives either an ON or OFF signal with a delay of time (x) corresponding to the distance (Δp). However, when the ID card 1 is pulled back in the direction opposite to the arrow direction, the light receiver 7 of the identification sensor 8 receives an ON or OFF signal with a delay of time (x+a) corresponding to a size (p−Δp). As a result, there arises a shift in the signal received by the light receiver 7 of the identification sensor 8 between the insertion direction and the pull-back or the drawing out direction of the ID card 1.

Accordingly, the control section 10 can determine that the ID card 1 has been inserted when the light receiver 16 of the reference sensor 12 receives the signal of the reference pattern after an elapse of the time (X) since the light receiver 16 of the reference sensor 12 receives the signal of the reference pattern 11. Furthermore, the control section can determine that the ID card 1 has been pulled back when the light receiver 7 receives the signal of the identification pattern 4 after an elapse of time (x+a). Then, by taking advantage of this, the control section 10 can perform the processing of registering identification data when the ID card 1 is inserted, and erasing the identification data when the ID card 1 is pulled back.

In addition, a similar effect can be produced when the positions of the identification sensor 8 and the reference sensor 12 are shifted in the transfer (insertion) direction of the ID card, instead of shifting the reference pattern 11 and the identification pattern 4 as shown above.

Figure 9:
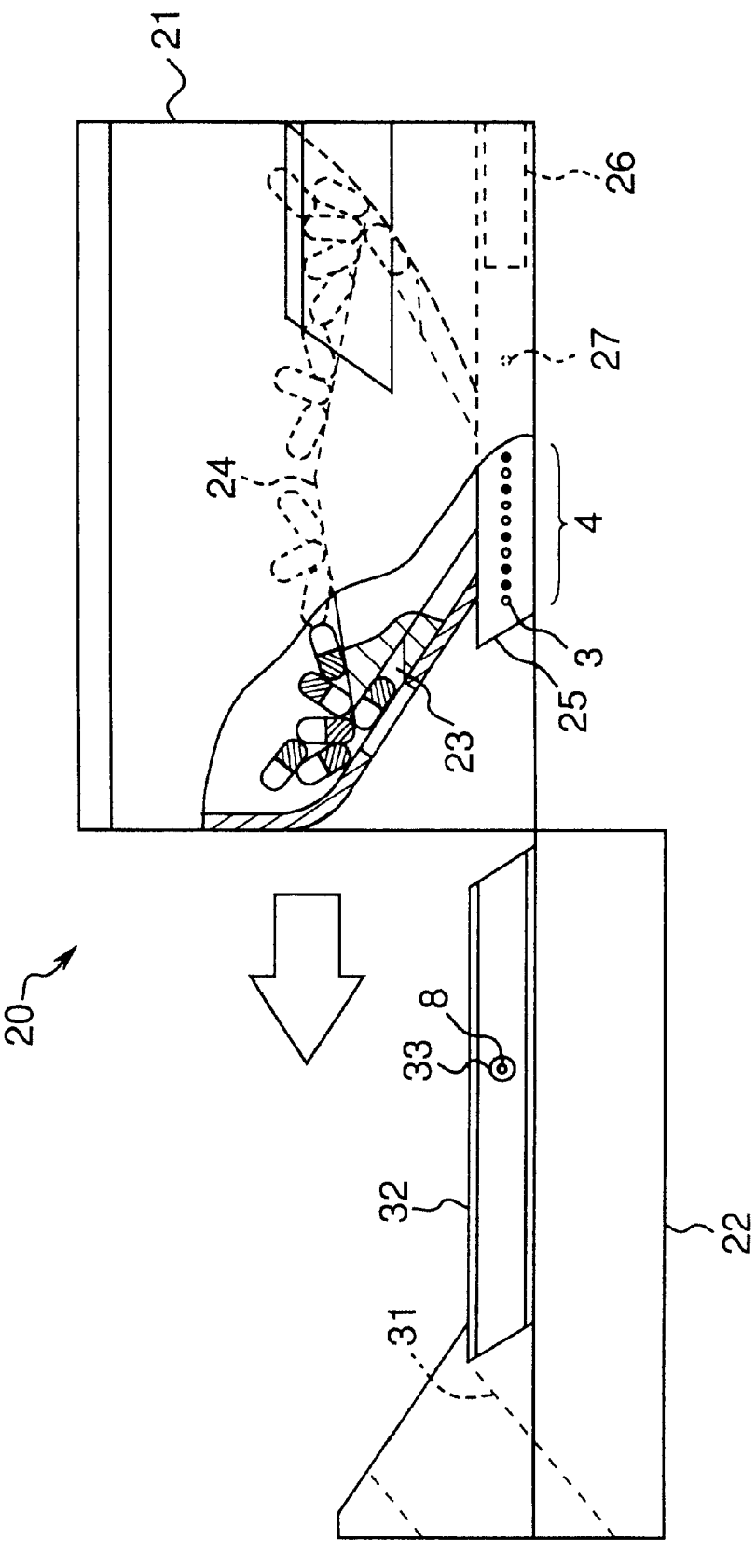
FIG. 9 is a partly broken side view showing a medicine feeder according to a fourth embodiment of the invention.
Figure 10:
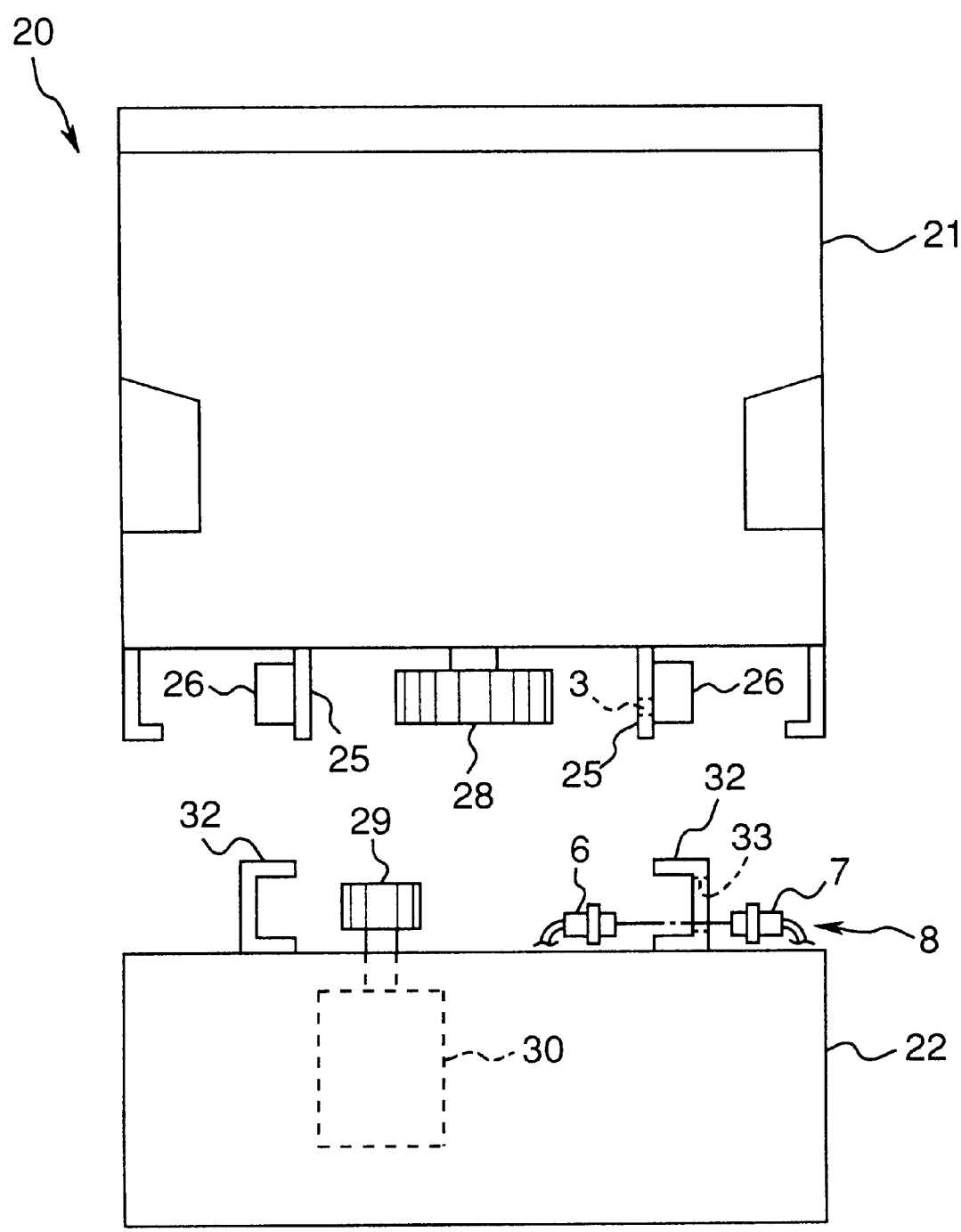
FIG. 10 is a front view showing the medicine feeder of FIG. 9.

FIG. 9 shows a fourth embodiment of the present invention. This embodiment is a case in which the identification apparatus of the present invention is applied to a medicine feeder 20 of a medicine packaging machine which packages medicines, such as capsules and tablets, dose by dose in accordance with a prescription.

This medicine feeder 20 comprises a medicine cartridge 21 as an identification object, and a motor base 22 to which the medicine cartridge 21 is removably loaded.

The medicine cartridge 21 is a lid-equipped container for accommodating therein a large number of medicines such as capsules. On the bottom of and inside the container, a rotor 24 has a pocket 23 rotatably provided on the outer circumference. Also on the outer bottom surface of the medicine cartridge 21, two projecting strip plates 25 are provided in parallel with the direction in which the motor base 22 is loaded. These projecting strip plates 25 each have an engaging projection 26 for engagement with a later-described guide member 32 of the motor base 22. Further, one projecting strip plate 25 is given a ten-digit identification pattern 4, as in the ID card 1 of the first embodiment. This identification pattern 4 represents the name of the medicine accommodated in the medicine cartridge 21. In addition, the projecting strip plate 25 has a load-completion detecting hole 27 bored in the rear of the identification pattern 4.

The motor base 22 has a motor 30 for rotationally driving a rotor 24 of the medicine cartridge 21 via gears 28, 29, and a passage 31 for receiving a medicine taken out from the medicine cartridge 21 and guiding the medicine to an unshown packaging apparatus. On the top surface of the motor base 22, is formed a guide member 32 for guiding the two projecting strip plates 25 and receiving the engaging projections 26 when the medicine cartridge 21 is loaded in the arrow direction. This guide member 32 has a sensor mounting hole 33 bored at a position which corresponds to the load-completion detecting hole 27 when the medicine cartridge 21 reaches the completely loaded state. Further, on both sides of this sensor mounting hole 33, is provided an identification sensor 8 which comprises a light transmitter 6 and a light receiver 7 similar to those of the identification sensor 8 of the first embodiment.

In the medicine feeder 20 having the above constitution, as the medicine cartridge 21 is loaded onto the motor base 22 in the arrow direction, the identification pattern 4 added to the projecting strip plate 25 of the medicine cartridge 21 is identified by the identification sensor 8 in the same manner as in the first embodiment. By this identification, depending on the present conditions of the motor base 22 to which the medicine cartridge 21 is loaded, it can be determined whether or not a correct medicine cartridge 21 has been loaded to the motor base 22. Also, when the medicine cartridge 21 is arbitrarily loaded onto the motor base 22, the medicine name of the medicine cartridge 21 that has been loaded to the motor base 22 can be determined.

When the medicine cartridge 21 is completely loaded to the motor base 22, the load-completion detecting hole 27 of the medicine cartridge 21 perfectly coincides with the sensor mounting hole 33. Thus, light transmitted from the light transmitter 6 of the identification sensor 8 passes through the load-completion detecting hole 27 and the sensor mounting hole 33 so as to be received by the light receiver 7. Meanwhile, when the medicine cartridge 21 is not completely mounted to the motor base 22, the load-completion detecting hole 27 of the medicine cartridge 21 does not coincide with the sensor mounting hole 33. Thus, the light transmitted from the light transmitter 6 of the identification sensor 8 is intercepted by the projecting strip plates 25 so as not to be received by the light receiver 7. Accordingly, depending on whether or not the light receiver 7 has received the light transmitted from the light transmitter 6, it can determine whether or not the medicine cartridge 21 has been completely loaded to the motor base 22. Thus, this determination of an incomplete loading of the medicine cartridge 21, allows the medicine feeder 20 to be prevented from faulty operation.

Figure 11:
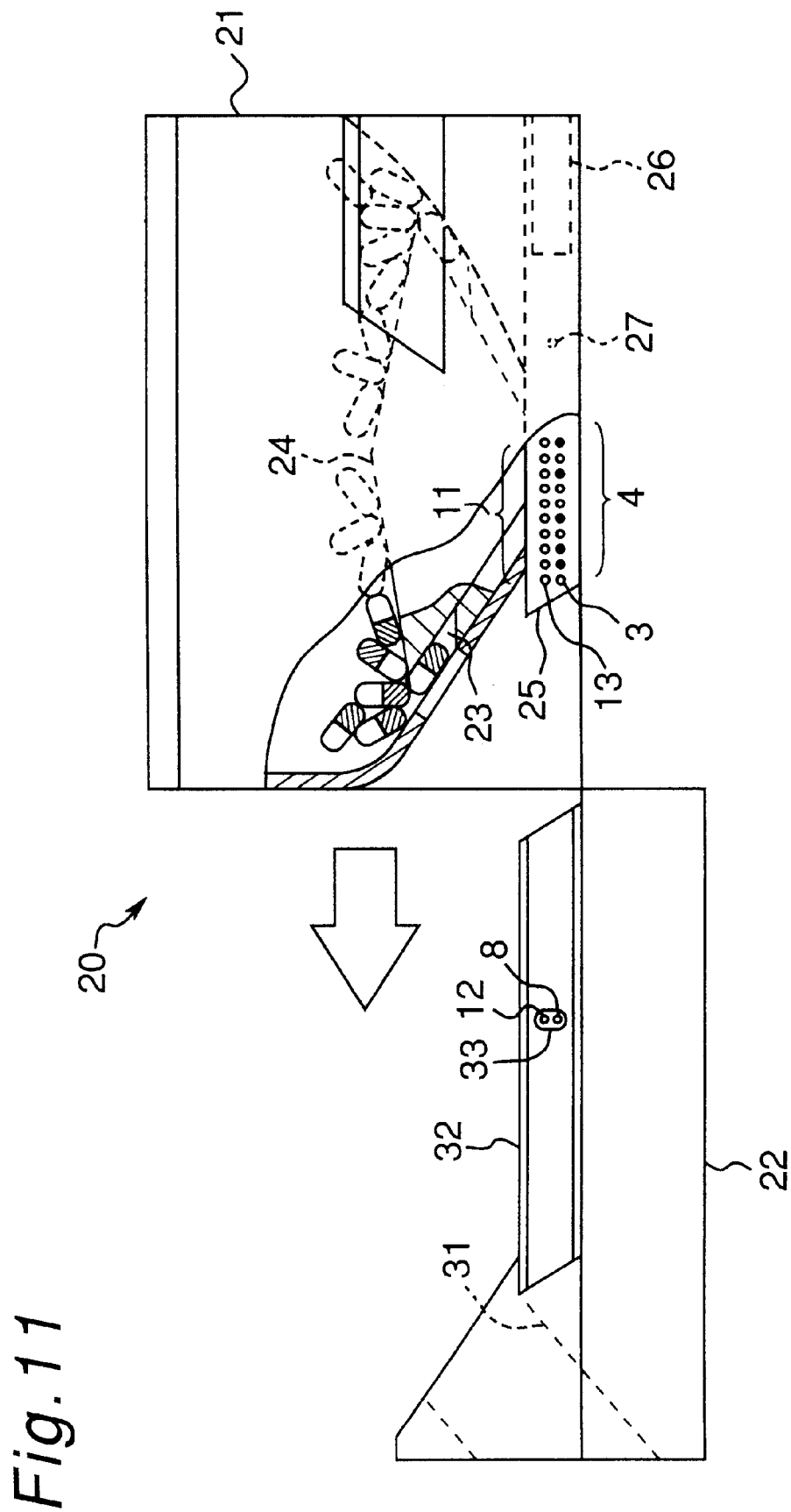
FIG. 11 is a partly broken side view showing a medicine feeder according to a fifth embodiment of the invention.
Figure 12:
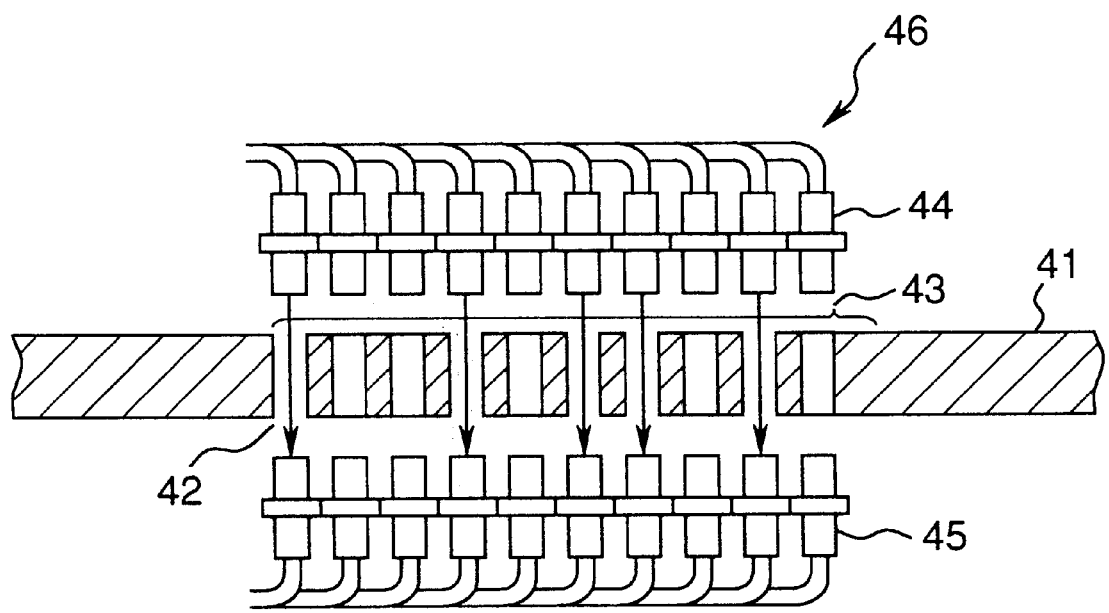
FIG. 12 is a view showing a conventional identification apparatus.

FIG. 11 shows a fifth embodiment of the present invention. In this embodiment, a projecting strip plate 25 of the medicine cartridge 21 is given a reference pattern 11 adjacent the identification pattern 4, and the motor base 22 is provided with a reference sensor 12 for identifying the reference pattern 11 in addition to the identification sensor 8. Otherwise, the embodiment is substantially the same as the foregoing fourth embodiment, and corresponding components are denoted by like numerals and omitted in explanation.

In this fifth embodiment, as in the ID card 1 of the second embodiment, every time the reference sensor 12 identifies each reference hole 13 of the reference pattern 11, the identification pattern 4 of the medicine cartridge 21 is identified depending on whether or not the light receiver 7 of the identification sensor 8 receives light transmitted from the light transmitter 6. Accordingly, even when the speed at which the medicine cartridge 21 is loaded is irregular, the identification pattern 4 of the medicine cartridge 21 can be identified with reliability.

In this fifth embodiment, it is also possible that the identification pattern 4 of the medicine cartridge 21 is placed so as to be shifted in the transfer Goading) direction with respect to the reference pattern 11 or that the identification sensor 8 is placed so as to be shifted in the transfer (loading) direction with respect to the reference sensor 12, as in the third embodiment.

Also, in the fifth embodiment, the reference pattern 11 and the identification pattern 4 have been provided to one projecting strip plate 25. However, it is also possible that the reference pattern 11 is provided on one of the two projecting strip plates 25, with the identification pattern 4 provided on the other.

Furthermore, although a sensor that transmits and receives light has been employed as the identification sensor 8 and the reference sensor 12 in the above embodiments, it is also possible to use sensors that transmit and receive ultrasonic waves. What is important is to use a communication medium that will pass through the identification hole 3 and the reference hole 13 formed in the identification-object ID card 1 or the projecting strip plates 25 of the medicine cartridge 21, but will not pass through the other parts.

What is claimed is:

1. An identification apparatus comprising:

an identification object intended to be transferred in a transfer direction, said identification object comprising a reference pattern formed parallel to said transfer direction and comprising a plurality of reference holes spaced a predetermined distance apart, said identification object also comprising an identification pattern formed parallel to said transfer direction and comprising a plurality of points equal in number to said reference holes, wherein one of an identification hole and a solid portion is located at each of said points thereby constituting storage of information;

a reference sensor comprising a reference transmitter for transmitting, in a direction transverse to said transfer direction, one of light and an ultrasonic wave from a first side of said identification object through said reference holes, and a reference receiver for receiving said one of light and an ultrasonic wave on a second side of said identification object;

an identification sensor comprising an identification transmitter for transmitting, in a direction transverse to said transfer direction, another of light and an ultrasonic wave from said first side of said identification object through said identification holes, and an identification receiver for receiving said another of light and an ultrasonic wave on said second side of said identification object;

wherein said identification object, said reference sensor, and said identification sensor are arranged such that said one of light and an ultrasonic wave is received through each reference hole for each point of said identification pattern as said identification object is transferred in said transfer direction to serve as a reference by indicating the presence of each of said points thereby allowing said identification sensor to accurately identify the information stored by said identification pattern by comparing the reference provided by the reference pattern with said another of light and an ultrasonic wave received through said identification holes; and said plurality of points of said identification pattern being offset in a direction of said transfer direction from said reference holes of said reference pattern by a distance which is less than half of said predetermined distance, such that as said identification object is transferred in said transfer direction a certain amount of time elapses between said one of light and an ultrasonic wave being received through each of said reference holes by said reference receiver and said another of light and an ultrasonic wave being received through each of said identification holes by said identification receiver.

2. The identification apparatus of claim 1, wherein:

said identification object comprises a medicine cartridge capable of being removably mounted to a motor base.

3. The identification apparatus of claim 2, wherein:

said medicine cartridge has a load-completion hole through which said one of light and an ultrasonic wave transmitted from said reference transmitter passes when said medicine cartridge is completely loaded to said motor base.

4. The identification apparatus of claim 2, wherein:

said medicine cartridge has a load-completion hole through which said another of light and an ultrasonic wave transmitted from said identification transmitter passes when said medicine cartridge is completely loaded to said motor base.

5. An identification apparatus comprising:

an identification object intended to be transferred in a transfer direction, said identification object comprising a reference pattern formed parallel to said transfer direction and comprising a plurality of reference holes spaced a predetermined distance apart, said identification object also comprising an identification pattern formed parallel to said transfer direction and comprising a plurality of points equal in number to said reference holes, wherein one of an identification hole and a solid portion is located at each of said points thereby constituting storage of information;

a reference sensor comprising a reference transmitter for transmitting, in a direction transverse to said transfer direction, one of light and an ultrasonic wave from a first side of said identification object through said reference holes, and a reference receiver for receiving said one of light and an ultrasonic wave on a second side of said identification object;

an identification sensor comprising an identification transmitter for transmitting, in a direction transverse to said transfer direction, another of light and an ultrasonic wave from said first side of said identification object through said identification holes, and an identification receiver for receiving said another of light and an ultrasonic wave on said second side of said identification object;

wherein said identification object, said reference sensor, and said identification sensor are arranged such that said one of light and an ultrasonic wave is received through each reference hole for each point of said identification pattern as said identification object is transferred in said transfer direction to serve as a reference by indicating the presence of each of said points thereby allowing said identification sensor to accurately identify the information stored by said identification pattern by comparing the reference provided by the reference pattern with said another of light and an ultrasonic wave received through said identification holes; and said identification sensor is offset in a direction of said transfer direction from said reference sensor by a distance which is less than half of said predetermined distance, such that as said identification object is transferred along said transfer direction a certain amount of time elapses between said one of light and an ultrasonic wave being received through each of said reference holes by said reference receiver and said another of light and an ultrasonic wave being received through each of said identification holes by said identification receiver.

6. The identification apparatus of claim 5, wherein:

said identification object comprises a medicine cartridge capable of being removably mounted to a motor base.

7. The identification apparatus of claim 6, wherein:

said medicine cartridge has a load-completion hole through which said one of light and an ultrasonic wave transmitted from said reference transmitter passes when said medicine cartridge is completely loaded to said motor base.

8. The identification apparatus of claim 6, wherein:

said medicine cartridge has a load-completion hole through which said another of light and an ultrasonic wave transmitted from said identification transmitter passes when said medicine cartridge is completely loaded to said motor base.

\* \* \* \* \*